United States Patent
Lee et al.

(10) Patent No.: US 12,314,557 B2
(45) Date of Patent: May 27, 2025

(54) DISPLAY DEVICE

(71) Applicant: LG ELECTRONICS INC., Seoul (KR)

(72) Inventors: Bitna Lee, Seoul (KR); Anna Kim, Seoul (KR); Jihee Moon, Seoul (KR); Dain Jeong, Seoul (KR); Seokwon Seo, Seoul (KR); Donghee Lee, Seoul (KR); Daegun Park, Seoul (KR); Sohyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/927,316

(22) PCT Filed: May 11, 2021

(86) PCT No.: PCT/KR2021/005836
§ 371 (c)(1),
(2) Date: Nov. 22, 2022

(87) PCT Pub. No.: WO2022/239881
PCT Pub. Date: Nov. 17, 2022

(65) Prior Publication Data
US 2024/0231598 A1    Jul. 11, 2024

(51) Int. Cl.
*G06F 3/0488*    (2022.01)
*G06F 3/0346*    (2013.01)
(Continued)

(52) U.S. Cl.
CPC .......... *G06F 3/0488* (2013.01); *G06F 3/0346* (2013.01); *G06F 3/0354* (2013.01);
(Continued)

(58) Field of Classification Search
CPC .... G06F 3/0484; G06F 3/0488; G06F 3/0485; G06F 3/0482; G06F 3/03547; G06F 3/03543; G06F 3/0486; G06F 3/0412; G06F 3/0346; G06F 3/0354; H04N 21/47217; H04N 21/47202; H04N 21/4722;
(Continued)

(56) References Cited

U.S. PATENT DOCUMENTS

2010/0283747 A1    11/2010    Kukulski
2013/0002567 A1    1/2013     Lee et al.
(Continued)

FOREIGN PATENT DOCUMENTS

JP    3-269712 A    12/1991
JP    2006-4101 A   1/2006
(Continued)

*Primary Examiner* — Xuemei Zheng
(74) *Attorney, Agent, or Firm* — Birch, Stewart, Kolasch & Birch, LLP

(57) ABSTRACT

A display device comprises a user input interface configured to receive touch input, a display configured to output a screen provided by an application, and a controller configured to determine whether the application supports touch input, to determine whether a mouse input function is supported, when the application does not support touch input and to perform a function corresponding to the touch input based on whether the mouse input function is supported.

19 Claims, 12 Drawing Sheets

(51) Int. Cl.
*G06F 3/0354* (2013.01)
*G06F 3/0485* (2022.01)
*G06F 3/0486* (2013.01)
*G06F 3/041* (2006.01)

(52) U.S. Cl.
CPC ........ *G06F 3/03543* (2013.01); *G06F 3/0485* (2013.01); *G06F 3/0486* (2013.01); *G06F 3/0412* (2013.01)

(58) Field of Classification Search
CPC ......... H04N 21/2187; H04N 21/42224; H04N 21/42204; H04N 21/42222; H04N 21/422; H04N 21/42208; H04N 21/4222; H04N 21/4221; H04N 21/4227
See application file for complete search history.

(56) References Cited

U.S. PATENT DOCUMENTS

| | | | |
|---|---|---|---|
| 2013/0257912 A1* | 10/2013 | Ushioda | G06F 3/04855 345/684 |
| 2014/0104195 A1 | 4/2014 | Davidson | |
| 2014/0191960 A1 | 7/2014 | Jeong et al. | |
| 2015/0026586 A1* | 1/2015 | Nylund | H04L 67/025 715/740 |
| 2016/0345048 A1* | 11/2016 | Kim | G06F 3/04845 |
| 2017/0068402 A1* | 3/2017 | Lochhead | H04N 21/47217 |
| 2019/0302997 A1 | 10/2019 | Kouda | |
| 2019/0306491 A1 | 10/2019 | Koyama | G06F 3/04815 |
| 2020/0301575 A1* | 9/2020 | Lindholm | H04N 21/4722 |
| 2020/0304880 A1* | 9/2020 | Diaz Delgado | G06F 9/451 |
| 2024/0220089 A1* | 7/2024 | Wan | G06F 3/0484 |

FOREIGN PATENT DOCUMENTS

| | | |
|---|---|---|
| JP | 2012-73719 A | 4/2012 |
| JP | 2015-106874 A | 6/2015 |
| JP | 2016-42337 A | 3/2016 |
| JP | 2019-170422 A | 10/2019 |
| KR | 10-2010-0042762 A | 4/2010 |
| KR | 10-2011-0036005 A | 4/2011 |
| KR | 10-2014-0074562 A | 6/2014 |
| KR | 10-2014-0089874 A | 7/2014 |
| KR | 10-2015-0009376 A | 1/2015 |
| KR | 10-1505806 B1 | 3/2015 |
| KR | 10-1574752 B1 | 12/2015 |

* cited by examiner

FIG. 6
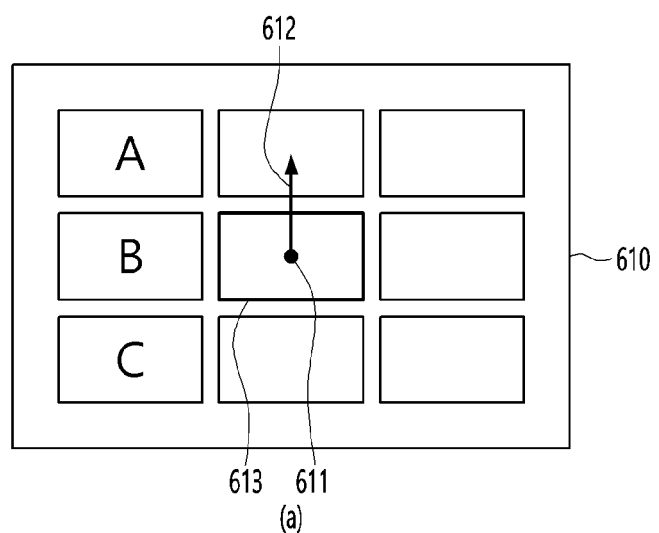
(a)
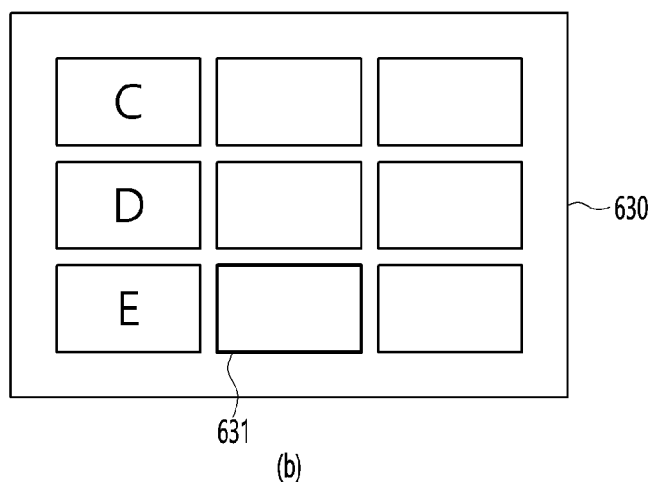
(b)

FIG. 7
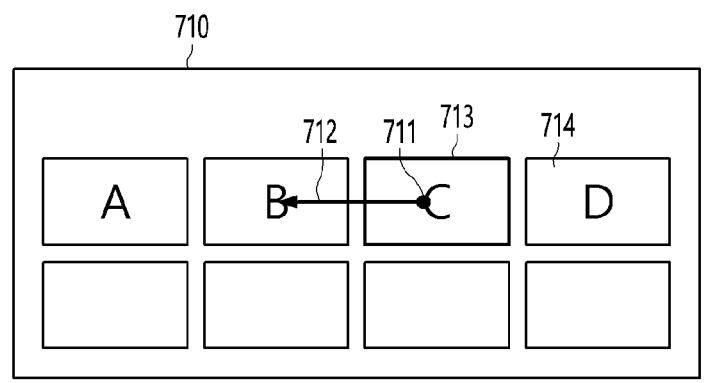
(a)
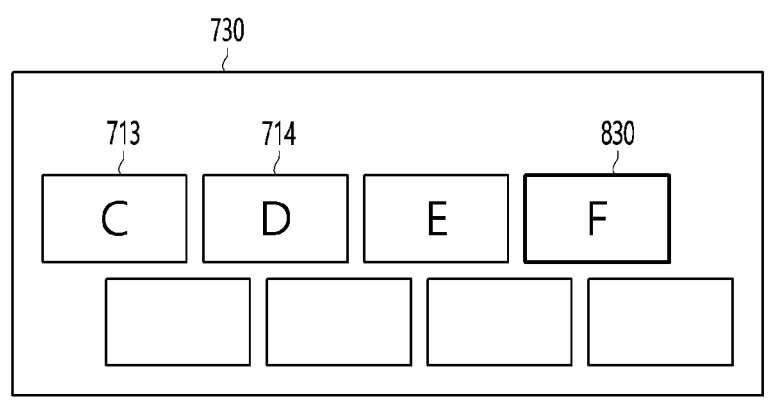
(b)

FIG. 8
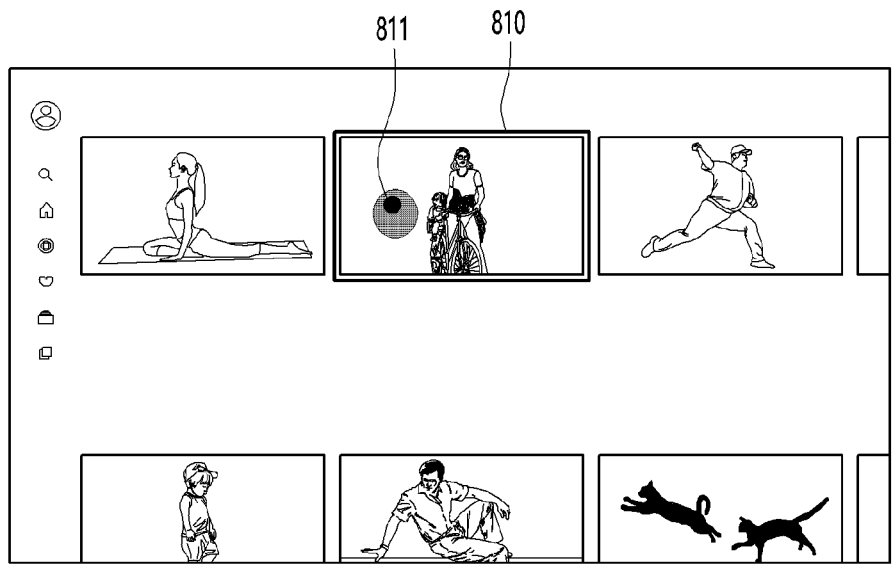
(a)
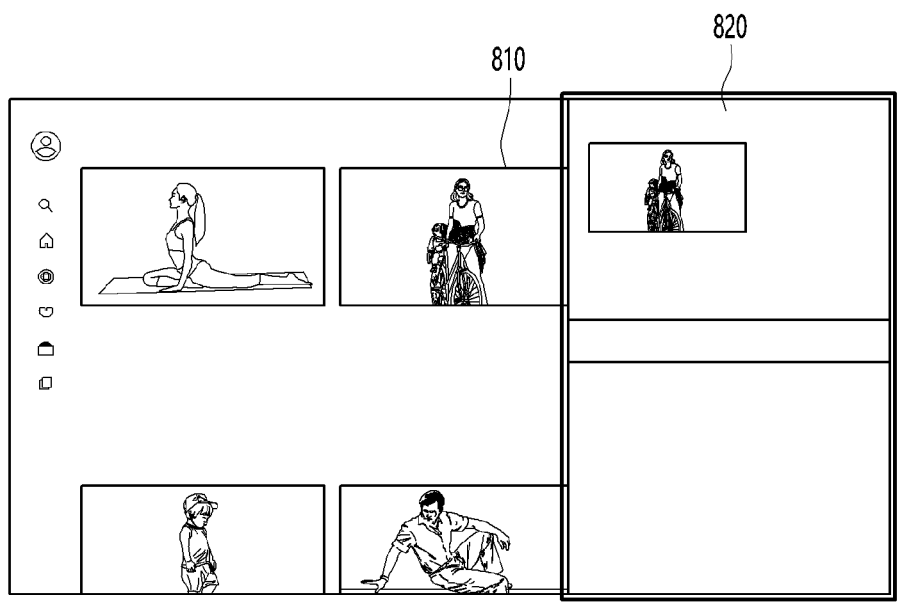
(b)

FIG. 12
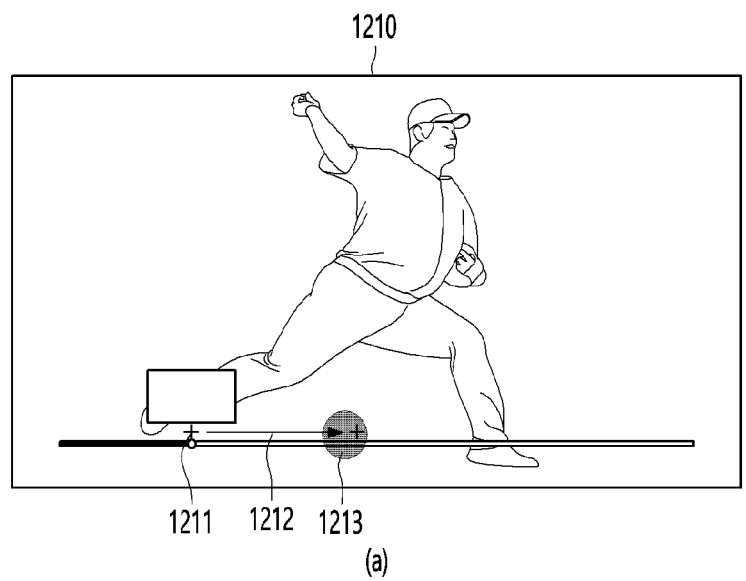
1211  1212  1213
(a)
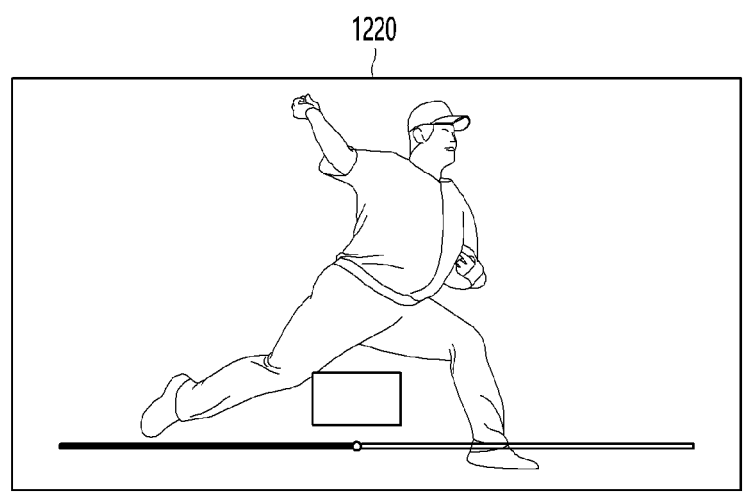
(b)

DISPLAY DEVICE

CROSS REFERENCE TO RELATED APPLICATION

This application is the National Phase of PCT International Application No. PCT/KR2021/005836, filed on May 11, 2021, which is hereby expressly incorporated by reference into the present application.

TECHNICAL FIELD

The present disclosure relates to a method of controlling a display device using touch input.

BACKGROUND ART

A display device has a function for receiving, processing and displaying an image capable of being viewed by a user. A display device receives a broadcast signal selected by a user from among broadcast signals transmitted from broadcast stations, separates an image signal from the received signal, and displays the separated image signal on a display, for example.

On the other hand, as various applications such as smartphones start to be driven in display devices such as TVs, there was a need for a method of controlling an operated application in addition to channel change and volume control.

In addition, as user input methods are diversified, user input using a remote controller and user input through user touch input may be provided. Therefore, when user touch input is received, a display device may be controlled by recognizing a user's intention of touch input and performing an intended function of a user.

Meanwhile, in order to perform operation according to touch input, not only a display device but also an application may receive a function corresponding to touch input. However, when the display device may receive touch input but does not provide a function corresponding to touch input according to the type of the application which is being currently executed, the function corresponding to user touch input may not be performed.

INVENTION

Technical Problem

An object of the present disclosure is to provide a display device for performing a command corresponding to user touch input by switching user touch input to mouse input when an application provided by the display device does not support a touch input function.

An object of the present disclosure is to provide a display device for performing a command corresponding to user touch input by switching user touch input to directional key input when an application provided by the display device does not support a touch input function.

Technical Solution

A display device may comprise a user input interface configured to receive touch input, a display configured to output a screen provided by an application, and a controller configured to determine whether the application supports touch input, to determine whether a mouse input function is supported, when the application does not support touch input and to perform a function corresponding to the touch input based on whether the mouse input function is supported.

In addition, the screen may comprise at least one content, and, when the application supports the mouse input function, the controller may be configured to switch the touch input to mouse input and to perform a function corresponding to the mouse input.

In addition, when the touch input is touch at a specific location, the controller may be configured to switch the touch input to mouse click input at the specific location and to perform the mouse click input at the specific location.

In addition, when the touch input is long press input for the content, the controller may be configured to switch the touch input to long click input for the content and to output detailed information of the content corresponding to the long click input for the content.

In addition, when the touch input is touch at a specific location and drag in a specific direction, the controller may be configured to switch the touch input to mouse drag input in the specific direction after clicking the specific location and to output a screen on which the specific location is moved in a direction corresponding to the specific direction.

In addition, when the touch input is touch at a specific location and drag in a specific direction, the controller may be configured to switch the touch input to mouse drag input in the specific direction after clicking the specific location and to output a screen on which the specific location is moved in a direction corresponding to the specific direction.

In addition, the controller may be configured to output a plurality of contents included in one category arranged in a specific direction, to switch the touch input to mouse drag input in the specific direction after clicking the touched content when the touch input is touch of any one of the plurality of contents and drag in the specific direction, and to output a screen on which the plurality of contents is moved in the specific direction.

In addition, when the touch input is drag in a specific direction after long press input, the controller may be configured to switch the touch input to mouse drag input in the specific direction after clicking a current point in view of content which is being reproduced and to output content, a point in view of which has progressed as much as mouse drag input in a specific direction from the current point in view.

In addition, the controller may be configured to output a progress bar indicating progress of reproduction of content through the display, to switch the touch input to mouse drag input in the specific direction after clicking the progress bar when the touch input is touch at a specific point and drag in a specific direction, and to output content, a point in view of which has progressed in the specific direction from the current point in view.

In addition, the controller may be configured to output a guide window for guiding the mouse input function corresponding to the touch input.

In addition, the guide window may comprise at least one of a guide image for guiding a user's hand gesture or a guide image for a screen movement direction according to "the mouse input function corresponding to user input".

In addition, the screen may comprise at least one content, and the controller may be configured to switch the touch input to directional key input and to perform a function corresponding to the directional key input, when the application does not support the mouse input function.

In addition, when the touch input is touch at a specific location, the controller may be configured to switch the touch input to selected input at the specific location and to perform the selected input at the specific location.

In addition, when the touch input is touch at a specific location and drag in a specific direction, the controller may be configured to switch to directional key input in a first direction corresponding to an opposite direction of the specific direction, and to output a screen on which the specific location is moved in a direction corresponding to the specific direction.

In addition, the controller is configured to output a plurality of contents included in one category arranged in a specific direction, switch the touch input to directional key input in a first direction corresponding to an opposite direction of the specific direction after selecting the touched content when the touch input is touch of any one of the plurality of contents and drag in the specific direction, and output a screen on which the plurality of contents is moved in the specific direction.

In addition, when the touch input is drag in a specific direction after long press input, the controller may be configured to switch the touch input to directional key input in the specific direction after selecting a current point in view of content which is being reproduced, and outputs a screen, a point in view of which has progressed as much as directional key input in the specific direction from the current point in view.

In addition, the controller may be configured to output a progress bar indicating progress of reproduction of content through the display, to determine directional key input in a first direction corresponding to the specific direction when the user input is touch at a specific point of view on the progress bar and drag in a specific direction, and to output content, a point in view of which has progressed as the directional key input in the specific direction from the specific point in view of the content.

In addition, the controller may be configured to output a guide window for guiding the directional key input function corresponding to the user input.

In addition, the guide window may comprise at least one of a guide image for guiding a user's hand gesture or a guide image for a screen movement direction according to "the mouse input function corresponding to user input".

In addition, the screen may further comprise a scroll bar capable of being scrolled, and, when the touch input is touch in a specific area of the scroll bar and drag in a specific direction, the controller may be configured to switch the touch input to mouse drag input in the specific direction after clicking the specific area of the scroll bar and to output a screen scrolled in the specific direction.

In addition, the screen may further comprise a scroll bar capable of being scrolled, and, when the touch input is touch in a specific area of the scroll bar and drag in a specific direction, the controller may be configured to switch the touch input to directional key input in the specific direction after clicking the specific area of the scroll bar and to output a screen scrolled in the specific direction.

Effect of the Invention

According to an embodiment of the present disclosure, it is possible to control a display device to perform a command corresponding to user touch input by switching to mouse input or directional key input even when an application which is installed in the display device and does not support touch is executed.

According to an embodiment of the present disclosure, it is possible to provide a notification notifying a user that touch input is possible even in an application which does not support touch by providing a guide indicating that touch input is being executed.

DESCRIPTION OF DRAWINGS

FIG. 6 is a view illustrating screen movement according to drag input after touch according to an embodiment of the present disclosure.

FIG. 7 is a view illustrating content movement according to drag input after touch according to an embodiment of the present disclosure.

FIG. 8 is a view illustrating a screen according to long press input according to an embodiment of the present disclosure.

FIG. 12 is a view a playback time point upon touch input according to an embodiment of the present disclosure.

BEST MODE

Hereinafter, the embodiments disclosed herein will be described in detail with reference to the accompanying drawings. The suffixes "module" and "unit or portion" for components used in the following description are merely provided only for facilitation of preparing this specification, and thus they are not granted a specific meaning or function.

Figure 1:
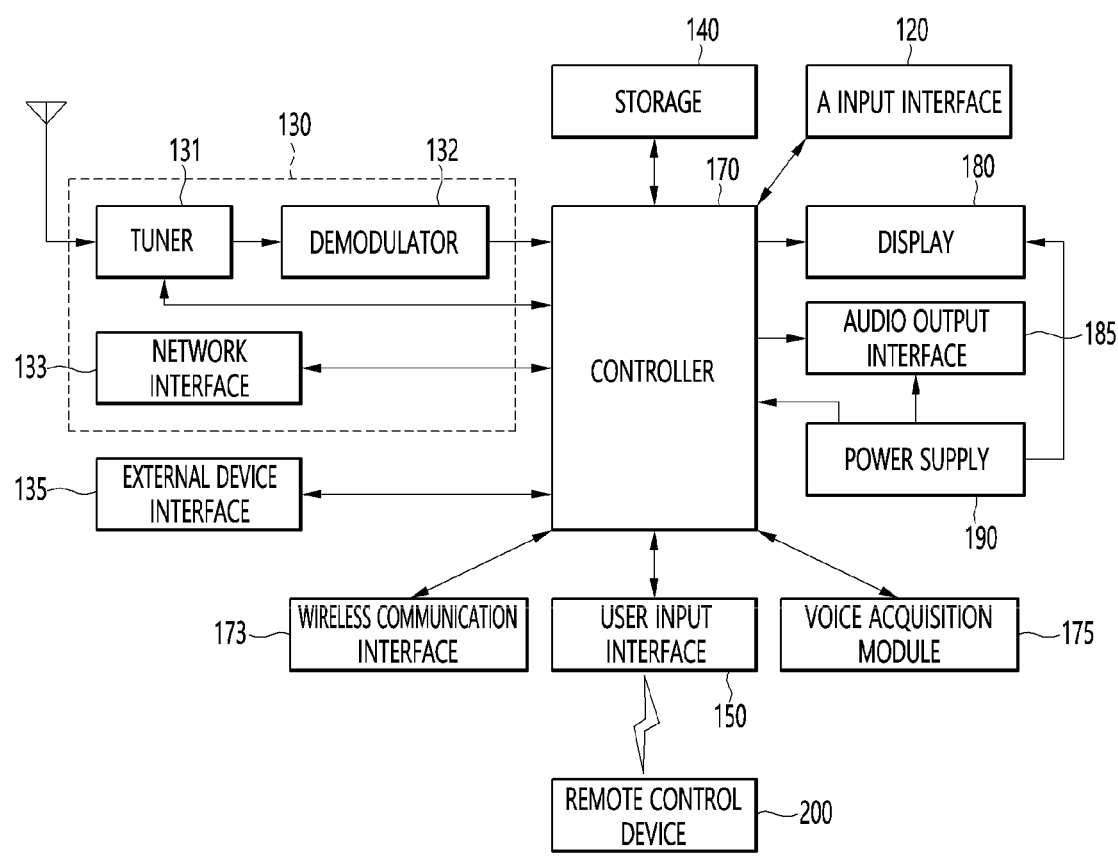
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
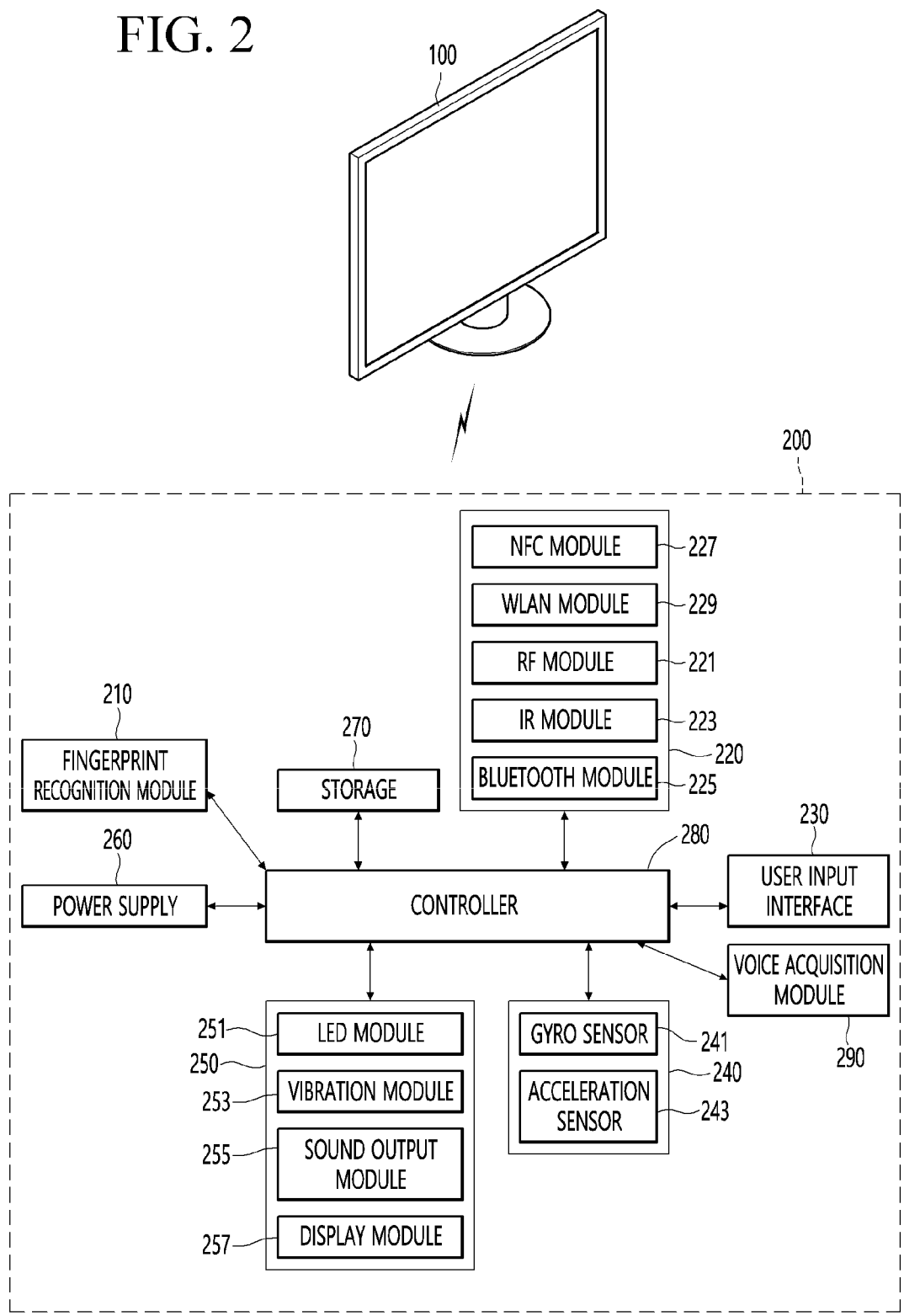
FIG. 2 is a block diagram illustrating a remote control device according to an embodiment of the present disclosure.
Figure 3:
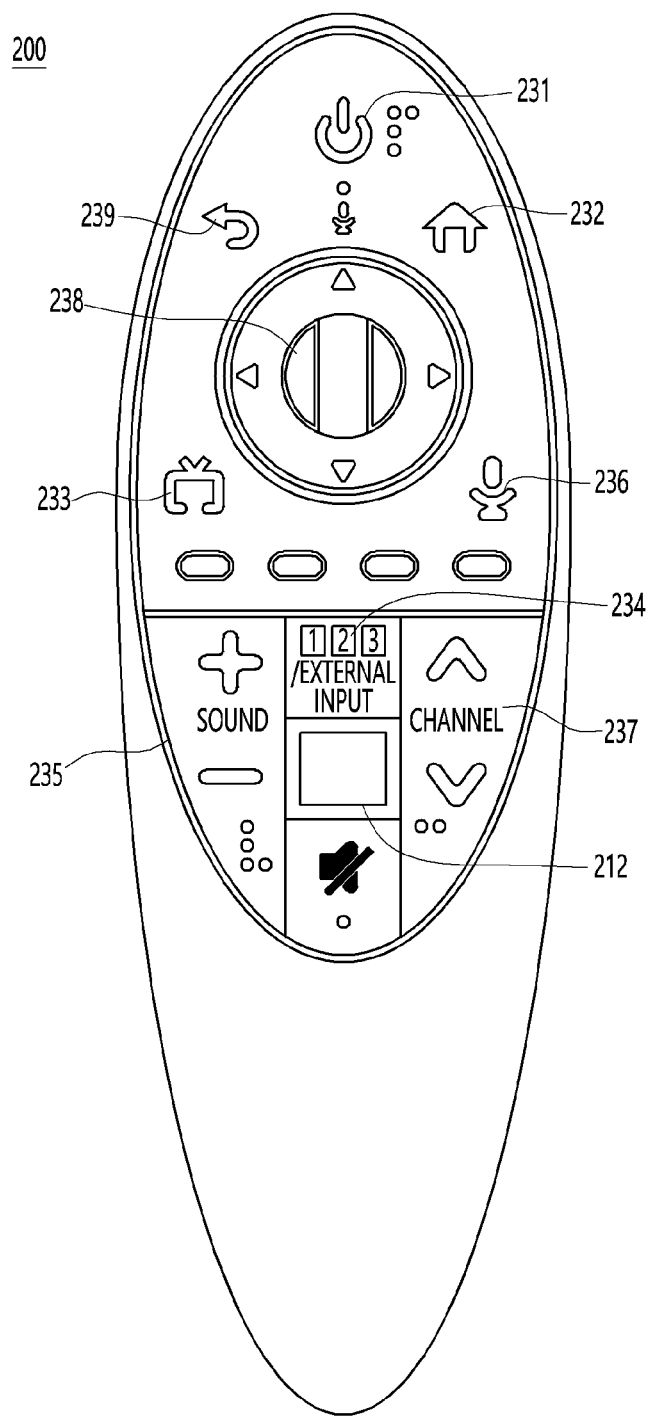
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
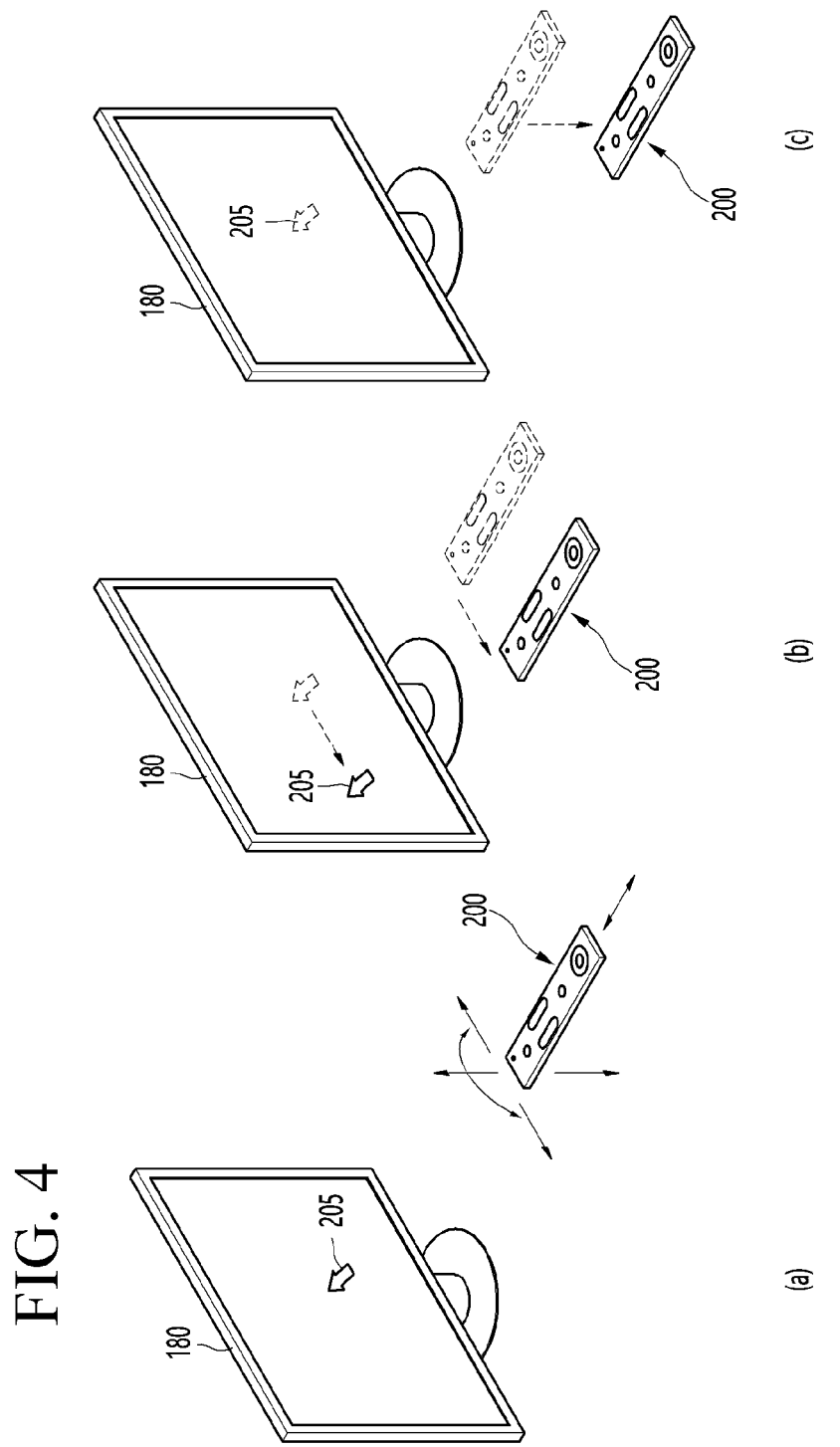
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Hereinafter, a flowchart of operation of a display device according to an embodiment of the present disclosure will be described.

First, the display device 100 according to an embodiment of the present disclosure may further include a user input interface 120.

The user input interface 120 may include a mechanical input unit (or a mechanical key, such as a button, a dome switch, a jog wheel, a jog switch, etc. located on a front/rear surface or side surface of the AI device 100) and a touch input unit.

As an example, the touch input unit may include a virtual key, a soft key or a visual key displayed on a touchscreen through software processing or a touch key disposed on a part other than the touchscreen.

Alternatively, the display device 100 may receive user touch input received by the display in correspondence with the touch input unit of the user input interface 120.

That is, the user may touch the display of the display device 100 to provide touch input to the user input interface 120, and the controller may receive touch input from the user through the user input interface 120.

Figure 5:
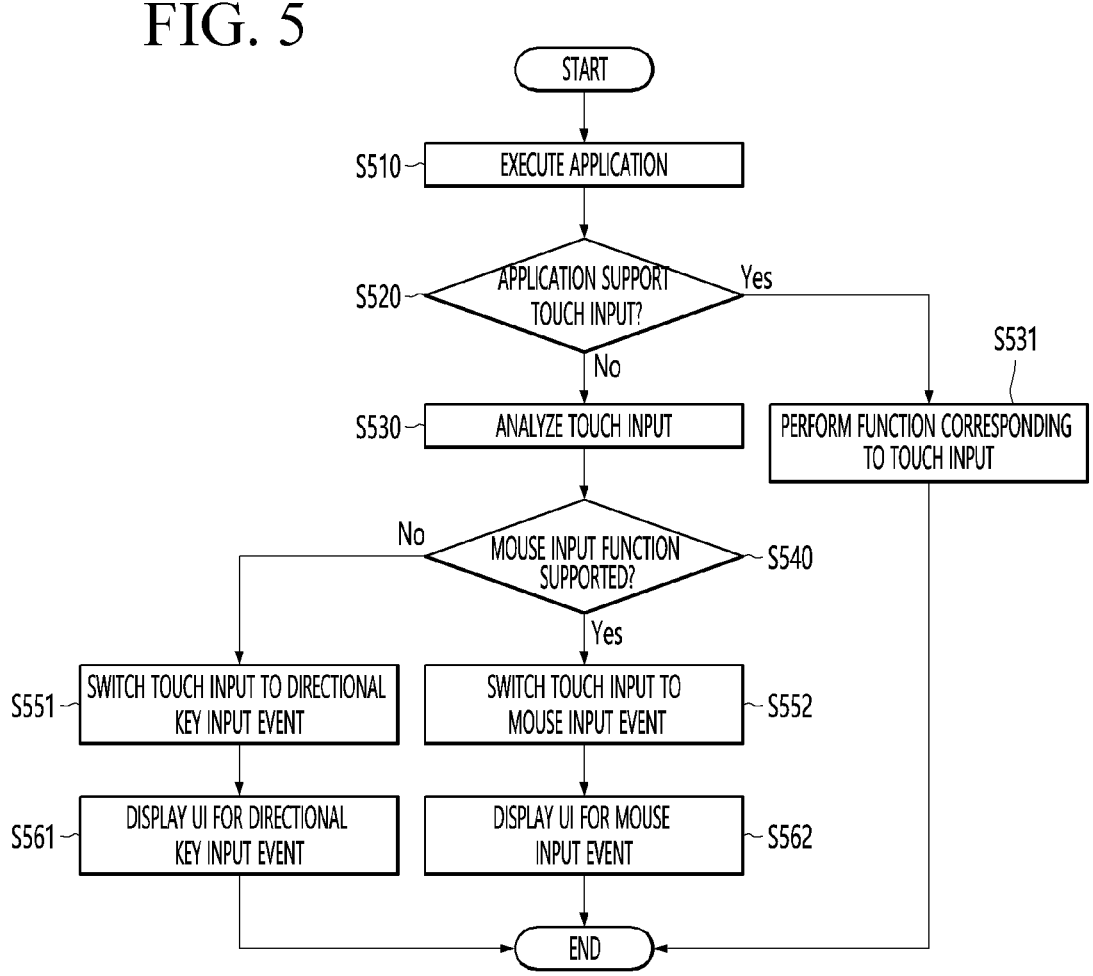
FIG. 5 is a flowchart according to an embodiment of the present disclosure.

FIG. 5 is a flowchart illustrating operation of a display device according to an embodiment of the present disclosure.

Referring to FIG. 5, the display device 100 may execute an application (S510). Specifically, the application may provide at least one image content, and the application may be stored in the storage 140 of the display device or provided from a server or a set-top box connected to the display device.

For example, the application may include video and image content, a web browser, a smart guide and external input content connected through a separate cable or wirelessly.

The controller 170 of the display device 100 may output a screen provided by the application, when the application is executed through the display.

The controller 170 according to the embodiment of the present disclosure may determine whether the application supports touch input (S520).

First, the application may be divided into an application which provides a function for performing a command corresponding to touch input when touch input is received and an application which does not provide a function for performing a command corresponding to touch input.

When a specific application is being executed in an operating system operating in a current display device, the controller 170 according to the embodiment of the present disclosure may determine whether the executed application supports touch input when touch input is received on a screen on which the specific application is output, and determine whether the application provides a function for performing a command corresponding to the touch input.

In general, since the operating system installed in the display device 100 stores application information of the executed application, the controller 170 may determine whether the application provides the function for performing the command corresponding to touch input using the application information.

In this case, the application information may include various information necessary for application operation such as an application type, an installation date, a function, a unique number, etc.

The controller 170 according to the embodiment of the present disclosure may determine whether to support touch input using the application information included in the application executed through the operating system.

When the executed application supports touch input, the controller 170 according to the embodiment of the present disclosure may receive touch input of a user through the input interface 120 and perform a function corresponding to touch input (S531).

In contrast, when the executed application does not support touch input (S520), the controller 170 according to the embodiment of the present disclosure may analyze the touch input of the user (S530) and perform a function corresponding to the touch input based on whether the application supports a mouse input function (S540).

Specifically, when the application supports the mouse input function, the controller may switch the touch input to mouse input and perform a function corresponding to the mouse input (S552, S562)

In addition, when the application does not support the mouse input function, the controller may switch the touch input to directional key input and perform a function corresponding to the directional key input (S551, S561).

Hereinafter, the type of user touch input according to the embodiment of the present disclosure will be described and then screen movement and content reproduction corresponding thereto will be described.

First, the controller 170 according to the embodiment of the present disclosure may analyze touch input of a user (S530).

In this case, user touch input analysis may mean that, in a display device for providing touch input, a function corresponding to user touch input received through the display 180 or user touch input received through the input interface is analyzed.

The controller 170 may recognize various user touch inputs such as touch at specific location, drag after touching a specific location, long press at a specific location, drag after touching a progress bar, drag after touching a scroll bar, by analyzing the user touch input.

FIG. 6 is a view illustrating screen movement according to drag input after touch according to an embodiment of the present disclosure.

First, when an application is executed in the display device 100, the controller 170 of the display device may output a screen for providing an application including at least one contents.

The user may input touch input to the screen.

When the touch input of the user is touch at a specific location on the screen, the controller 170 according to the embodiment of the present disclosure may switch the touch input to mouse click input at the specific location and perform mouse click input at the specific location.

For example, when user touch input is received for first content 613 on the screen 610, the controller 170 may switch the touch input to click input for the first content 613, recognize it and execute the first content 613.

In addition, the user perform drag input after touching a specific location, for screen movement.

When the touch input of the user is touch at a specific location 611 and drag in a specific direction 612, the controller 170 according to the embodiment of the present disclosure may click the specific location 611, switch the touch input to mouse drag input in the specific direction 612, and output a screen on which the specific location is moved in a direction corresponding to the specific direction 612.

For example, as shown in FIG. 6(a), when the touch input of the user is touch at a specific location 611 and drag in a specific direction 612, the controller 170 may perform mouse click at the specific location 611, switch to mouse drag input in the specific direction 612, and recognize it.

Referring to FIG. 6(b), according to the mouse input, the controller may output a screen 630 on which the specific location 611 is moved in a direction corresponding to the specific direction 612.

On the moved screen 630, content 631 different from the first content 611 may be output.

A case where an application does not provide a mouse input function according to another embodiment of the present disclosure will be described.

When the touch input of the user is touch at a specific location, the controller 170 according to the embodiment of the present disclosure may switch the touch input to selected input at the specific location and perform the selected input at the specific location.

For example, when user touch input is received for the first content 613 on the screen, the controller 170 may switch the touch input to selected input for the first content 613, recognize it, and execute the first content.

In addition, the user may perform drag input after touching the specific location, for screen movement.

When the touch input of the user is touch at a specific location 611 and drag in a specific direction 612, the controller 170 according to the embodiment of the present disclosure may switch to directional key input in a first direction corresponding to an opposite direction of the specific direction 612, and output a screen on which the specific location 611 is moved in a direction corresponding to the specific direction 612.

For example, as shown in FIG. 6(a), when the touch input of the user is touch at a specific location 611 and drag in a specific direction 612, the controller may select the specific location 611, switch to directional key input in a first direction corresponding to the opposite direction of the specific direction 612, and recognize it.

Referring to FIG. 6(b), according to the directional key input in the first direction, the controller 170 may output a screen 630 on which the specific location 611 is moved in a direction corresponding to the specific location 612.

That is, according to the embodiment of the present disclosure, it can be seen that screen movement and content reproduction output result corresponding to user touch input is equally obtained in the mouse input function and the directional key input function.

FIG. 7 is a view illustrating content movement according to drag input after touch according to an embodiment of the present disclosure.

First, a case where an application supports a mouse input function will be described.

Referring to FIG. 7, when a plurality of contents is grouped by category, a user may perform drag touch input for switching focused content to other content or examining a plurality of contents lists included in the category.

Specifically, the controller 170 of the display device 100 may output a plurality of contents included in one category arranged in a specific direction.

In this case, when touch input of the user is touch of any one of the plurality of contents and drag in the specific direction, the controller switch the touch input to mouse drag input in the specific direction after clicking the touched content.

The controller 170 may output a screen on which the plurality of contents is moved in the specific direction through the display 180.

For example, contents 713 and 714 grouped into similar categories may be output on the screen 710 of FIG. 7(a).

The user may perform drag input in a specific direction 712 while touching a specific location 711 in order to examine the plurality of content lists included in the category.

In this case, the specific location 711 may be any one 713 of the contents grouped into similar categories.

The controller 170 according to the embodiment of the present disclosure may switch the touch input to mouse drag input in the specific direction 712 while clicking the specific location 711.

Thereafter, the controller 170 may output a screen 730 on which the plurality of contents 713 and 714 is moved in the specific direction 712, as shown in FIG. 7(b).

Hereinafter, a case where an application supports a directional key input function will be described.

According to another embodiment of the present disclosure, when user touch input is touch of any one of the plurality of contents and drag in a specific direction, the controller 170 may switch the touch input to directional key input in a first direction corresponding to an opposite direction of the specific direction after selecting the touched content, and output a screen on which the plurality of contents is moved in the specific direction.

As described above, referring to FIG. 7(a), the user may perform drag input in a specific direction 712 while touching a specific location 711 in order to examine a plurality of content lists included in the category.

The controller 170 according to the embodiment of the present disclosure may switch the touch input to directional key input in the first direction corresponding to the opposite direction of the specific direction 712 while selecting the specific location 711.

Thereafter, the controller 170 may output a screen 730 on which the plurality of contents 713 and 174 is moved in the specific direction 712.

FIG. 8 is a view illustrating a screen according to long press input according to an embodiment of the present disclosure.

According to an embodiment of the present disclosure, when user touch input is drag in a specific direction after long press input for specific content, the controller 170 may output detailed information of the specific content on a screen.

Specifically, when an executed application provides a mouse input function, the controller 170 may switch the touch input to long click input for the content and output detailed information of the content corresponding to the long click input for the content.

In this case, long click input may mean input in which a state of clicking the mouse is maintained for a predetermined time or longer.

Referring to FIG. 8(a) and FIG. 8(b), when long press input 811 of the user for specific content 810 is received, the controller 170 may switch the long press input to long click input for the content 810 and output a detailed information window 820 for the content.

In this case, when content is an image, the detailed information window may include at least one of a title, playback time, date, trailer, producer, playback and preview of the content.

Figure 9:
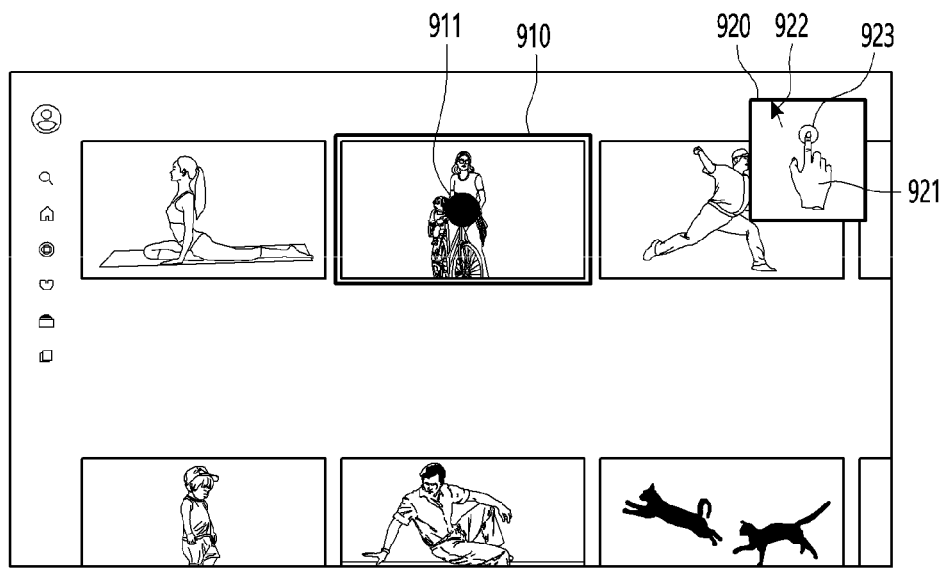
FIG. 9 is a view illustrating a guide window for guiding screen movement according to an embodiment of the present disclosure.

FIG. 9 is a view illustrating a guide window for guiding screen movement according to an embodiment of the present disclosure.

According to an embodiment of the present disclosure, although an application does not support touch input, operation according to touch input is performed. Accordingly, the display device 100 may output a guide notifying the user that touch input is switched to a mouse input function or directional key input function.

Specifically, referring to FIG. 9(a) and FIG. 9(b), when a user performs touch input at a specific location 911 for first content 910, the controller 170 may output a guide window 920 for guiding the mouse input function corresponding to the touch input.

For example, in the case of an application for providing the mouse input function, the guide window may include at least one of a guide image 9210 for guiding a user's hand gesture, a cursor guide image 922 indicating that the mouse input function is being executed or a guide image 923 indicating that touch input is currently being received.

In addition, when the mouse input function corresponds to mouse drag, a guide image for a screen movement direction may be output.

Figure 10:
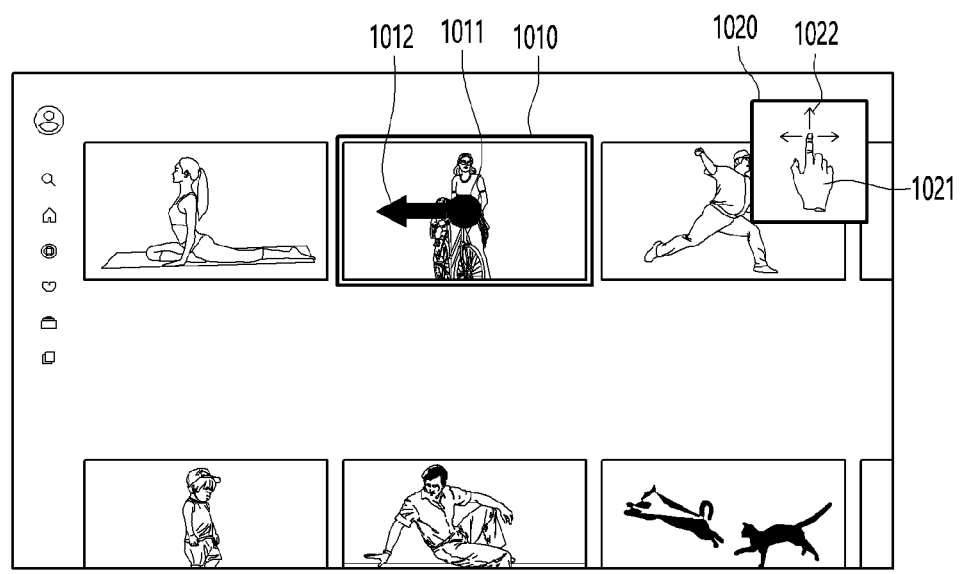
FIG. 10 is a view illustrating a guide window for guiding screen movement according to an embodiment of the present disclosure.

FIG. 10 is a view illustrating a guide window for guiding screen movement according to an embodiment of the present disclosure.

According to another embodiment of the present disclosure, in case of an application for providing a directional key input function, the controller 170 may output a guide window 1120 for guiding the directional key input function corresponding to user input.

Specifically, when drag input in a specific direction 1012 after touching a specific location 1011 for a first content 1010 is received from a user, the controller 170 may output the guide window 1020 for guiding directional key input.

The guide window 1020 for guiding the directional key input may include at least one of a guide image 1021 for guiding user's hand gesture or a guide image 1022 for a screen movement direction according to "the directional key input function corresponding to user input".

In addition, when a screen is moved in a specific direction according to touch input of the user, the controller 170 may also activate and display the directional key of the direction.

Figure 11:
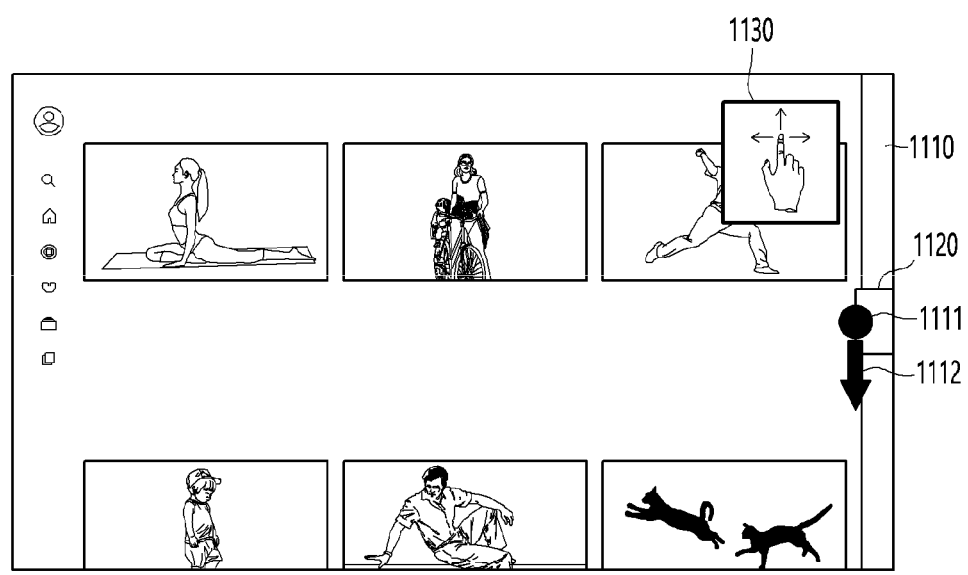
FIG. 11 is a view illustrating screen movement upon touch input according to an embodiment of the present disclosure.

FIG. 11 is a view illustrating screen movement upon touch input according to an embodiment of the present disclosure.

Meanwhile, a convenient tool for moving a screen, such as a scroll bar, may be provided on a screen provided by an application. Operation of the controller when a user inputs touch input using the scroll bar in order to move the screen provided by the application will be described.

A case where the application provides a mouse input function will be described first.

When touch input which is being performed by the user is input of touching a specific area of the scroll bar and performing drag in a specific direction, the controller 170 according to the embodiment of the present disclosure may switch the touch input to mouse drag input in the specific direction after clicking the specific area of the scroll bar, and output a screen scrolled in the specific direction.

For example, referring to FIG. 11, the screen may include a scroll bar 1110. When the touch input of the user is input of touching the specific area 1111 of the scroll bar 1110 and performing drag in the specific direction 1112, the controller 170 may switch the touch input to mouse drag input in the specific direction 1112 while clicking the specific area 1111, and output the screen scrolled in the specific direction 1112.

In this case, a scroll degree may be differently set according to a drag strength in the specific direction 1112 of the user.

Hereinafter, a case where an application provides a directional key function will be described.

When the touch input of the user is input of touching a specific area of a scroll bar and performing drag in a specific direction, the controller 170 according to another embodiment of the present disclosure may switch the touch input to directional key input in the specific direction after selecting the specific area of the scroll bar, and output a screen scrolled in the specific direction.

For example, referring to FIG. 12, when the touch input of the user is input of touching a specific area 1111 of the scroll bar 1110 and performing drag in a specific direction 1112, the controller 170 may switch to the directional key input in the specific direction 1112 while selecting the specific area 1111, and output a screen scrolled in the specific direction 1112.

Similarly, a scroll degree may be differently set according to a drag strength in the specific direction 1112 of the user.

Meanwhile, when the touch input, that is, input of touching the specific area of the scroll bar and performing drag is switched to a mouse input function or a directional key input function, the controller 170 may output a guide window 1130 indicating that the screen is being moved in the specific direction.

As described above, a guide image corresponding to the movement direction of the screen may be activated and displayed in the guide window 1130.

Hereinafter, an embodiment in which a content playback time point is set according to touch input of a user when content is reproduced will be described with reference to FIGS. 12 to 14.

FIG. 12 is a view a playback time point upon touch input according to an embodiment of the present disclosure.

Referring to FIG. 12, the controller 170 may reproduce content included in an application. In this case, the content may be an image or image data having a predetermined playback time.

A user may perform various touch inputs for pausing, fast forwarding, rewinding and movement to a specific point in time while content is reproduced.

When the touch input of the user is drag in a specific direction after long press input, the controller 170 according to the embodiment of the present disclosure may switch the touch input to mouse drag input in the specific direction after clicking a current point in time of the content which is being reproduced, and output content, the point in time of which has progressed as much as mouse drag input in the specific direction from the current point in view.

For example, referring to FIG. 12, content 1210 is reproduced on the display 180, and, when the user drags a specific location 1211 of the content in the specific direction 1212 (for example, the right direction) after long press input, the controller 170 may switch the touch input to mouse drag input in a right direction while clicking the current point in view of the content which is being reproduced and recognize it.

The controller 170 may output content 1220, the point in view of which has progressed 1213 as much as the mouse drag input in the right direction from the current point in view.

Figure 13:
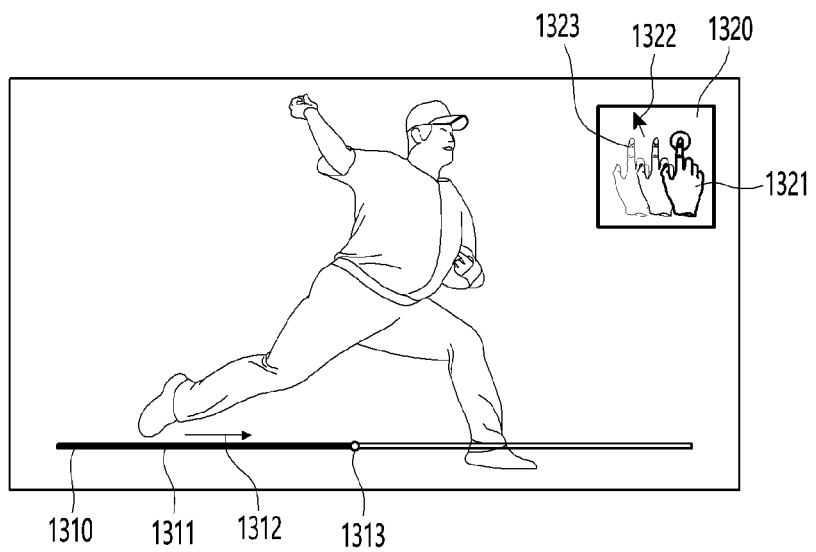
FIG. 13 is a view a playback time point upon touch input according to an embodiment of the present disclosure.

Meanwhile, as shown in FIG. 13, the controller 170 may output a progress bar 1310 indicating the progress of content through the display 180. As described above, when the touch input of the user is touch of a specific point 1311 and drag in a specific direction 1312, the controller 170 may switch the touch input to mouse drag input in the specific direction after clicking the progress bar 1310 of the current point in view and recognize it.

In addition, the controller 170 may output the progress bar 1313, the point in view of which has progressed as much as a drag strength in the specific direction 1312 from the current point in view 1311, and output content at a point in view corresponding to the progress bar 1313.

A case where an application provides directional key input according to another embodiment of the present disclosure will be described.

When the touch input is drag in a specific direction after long press input, the controller 170 according to the embodiment of the present disclosure may switch the touch input to directional key input in the specific direction after selecting the current point in view of the content which is being reproduced.

In addition, the controller 170 may output content, the point in view of which has progressed as much as directional key input in the specific direction 1312 from the current point in view.

In addition, the controller 170 may output the progress bar 1310 indicating the progress of the content through the display 180, determine directional key input in a first direction corresponding to the specific direction 1312 when the user input is touch of the specific point in view 1311 on the progress bar and drag in the specific direction 1312, and output content, the point in time of which has progressed as much as directional key input in the specific direction from the specific point in view of the content.

For example, when the specific point in time 1311 on the progress bar is touched and is dragged to the right, as shown in FIG. 13, the content 1320, the point in view of which has progressed as much as directional key input from the specific point in view 1311 of the content 1310, which is being reproduced, to the right.

Hereinafter, a guide window of a mouse input function or directional key input function according to playback time point movement will be described.

Referring to FIG. 13, as the mouse input function is performed, the controller 170 may output a guide window 1320 for guiding a playback time point movement to the user through the display 180.

The guide window 1320 according to the embodiment of the present disclosure may include at least one of a hand gesture guide image 1321 of the user according to the mouse input function, a cursor guide image 1322 or an image 1323 for guiding that the point in view is being moved in a direction corresponding to the specific direction 1312.

When the user touches the current point in view 1310 of the progress bar through the display 1280 and moves it in the specific direction to drag it to a point in view 1313, the controller 170 may output an effect 1323 in which the hand gesture guide image and the cursor guide image included in the guide window 1320 are moved.

The above embodiment may be equally applied to an application which provides not only the mouse input function but also the directional key input function.

Figure 14:
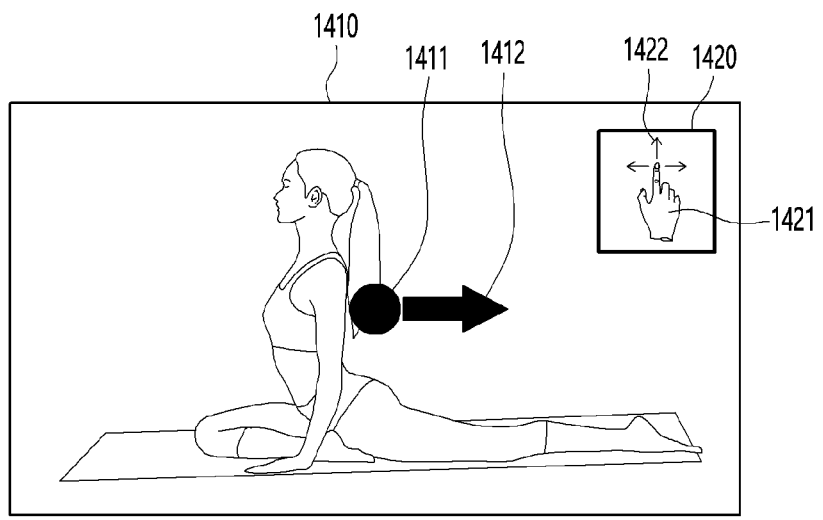
FIG. 14 is a view illustrating playback time point movement upon touch input according to an embodiment of the present disclosure.

FIG. 14 is a view illustrating playback time point movement upon touch input according to an embodiment of the present disclosure.

Referring to FIG. 14, as the directional key input function is performed, the controller 170 may output a guide window 1420 for guiding playback time point movement to the user through the display 180.

According to the guide window 1420 according to the embodiment of the present disclosure may include a hand gesture guide image 1421 of the user and a directional key guide image 1422 according to the directional key input function.

Not only when the user touches the current point in view of the progress bar through the display 180 and moves it in the specific direction to drag it to a later point in time but also when a specific area 1411 is touched and dragged in a specific direction 1412 while the content is reproduced, the controller 170 may output a guide image activated in a direction for adjusting a content playback time as the guide image included in the guide window 1420.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
a user input interface configured to receive a touch input;
a display configured to output a screen provided by an application; and
a controller configured to:
determine whether the application supports touch input,
determine whether a mouse input function is supported, when the application does not support touch input, and
perform a function corresponding to the touch input based on whether the mouse input function is supported,
wherein the screen comprises at least one content, and
wherein the controller is configured to switch the touch input to a directional key input and to perform a function corresponding to the directional key input, when the application does not support the mouse input function.

2. The display device of claim 1, wherein the screen comprises at least one content, and
wherein, when the application supports the mouse input function, the controller is configured to switch the touch input to a mouse input and to perform a function corresponding to the mouse input.

3. The display device of claim 2, wherein, when the touch input is touch at a specific location, the controller is configured to switch the touch input to a mouse click input at the specific location and to perform the mouse click input at the specific location, when the application supports the mouse input function.

4. The display device of claim 2, wherein, when the touch input is long press input for the content, the controller is configured to switch the touch input to a long click input for the content and to output detailed information of the content corresponding to the long click input for the content, when the application supports the mouse input function.

5. The display device of claim 2, wherein, when the touch input is touch at a specific location and drag in a specific direction, the controller is configured to switch the touch input to a mouse drag input in the specific direction after clicking the specific location and to output a screen on which the specific location is moved in a direction corresponding to the specific direction, when the application supports the mouse input function.

6. The display device of claim 2, wherein the controller is configured to:
output a plurality of contents included in one category arranged in a specific direction,
when the touch input is touch of any one of the plurality of contents and drag in the specific direction,
switch the touch input to a mouse drag input in the specific direction after clicking the touched content, when the application or e mouse input function, and
output a screen on which the plurality of contents is moved in the specific direction.

7. The display device of claim 2, wherein, when the touch input is drag in a specific direction after long press input, the controller is configured to switch the touch input to a mouse drag input in the specific direction after clicking a current point in view of content which is being reproduced and to output content, when the application supports the mouse input function, a point in view of which has progressed as much as mouse drag input in a specific direction from the current point in view.

8. The display device of claim 2, wherein the controller is configured to:
output a progress bar indicating progress of reproduction of content through the display,
when the touch input is touch at a specific point and drag in a specific direction, switch the touch input to a mouse drag input in the specific direction after clicking the progress bar, when the application supports the mouse input function, and
output content, a point in view of which has progressed in the specific direction from the current point in view.

9. The display device of claim 2, wherein the controller is configured to output a guide window for guiding the mouse input function corresponding to the touch input.

10. The display device of claim 9, wherein the guide window comprises at least one of a guide image for guiding a user's hand gesture or a guide image for a screen movement direction according to "the mouse input function corresponding to user input".

11. The display device of claim 2, wherein the screen further comprises a scroll bar capable of being scrolled, and
wherein, when the touch input is touch in a specific area of the scroll bar and drag in a specific direction, the controller is configured to switch the touch input to a mouse drag input in the specific direction after clicking the specific area of the scroll bar and to output a screen scrolled in the specific direction, when the application supports the mouse input function.

12. The display device of claim 1, wherein, when the touch input is touch at a specific location, the controller is configured to switch the touch input to a selected input at the specific location and to perform the selected input at the specific location.

13. The display device of claim 1, wherein, when the touch input is touch at a specific location and drag in a specific direction, the controller is configured to switch to a directional key input in a first direction corresponding to an opposite direction of the specific direction, and to output a screen on which the specific location is moved in a direction corresponding to the specific direction.

14. The display device of claim 1, wherein the controller is configured to:
output a plurality of contents included in one category arranged in a specific direction,
when the touch input is touch of any one of the plurality of contents and drag in the specific direction,
switch the touch input to a directional key input in a first direction corresponding to an opposite direction of the specific direction after selecting the touched content, and
output a screen on which the plurality of contents is moved in the specific direction.

15. The display device of claim 1, wherein, when the touch input is drag in a specific direction after long press input, the controller is configured to switch the touch input to a directional key input in the specific direction after selecting a current point in view of content which is being reproduced, and outputs a screen, a point in view of which has progressed as much as directional key input in the specific direction from the current point in view.

16. The display device of claim 1, wherein the controller is configured to:
output a progress bar indicating progress of reproduction of content through the display,
when the user input is touch at a specific point of view on the progress bar and drag in a specific direction, determine a directional key input in a first direction corresponding to the specific direction, and output content, a point in view of which has progressed as the directional key input in the specific direction from the specific point in view of the content.

17. The display device of claim 1, wherein the controller is configured to output a guide window for guiding the directional key input function corresponding to the user input.

18. The display device of claim 17, wherein the guide window comprises at least one of a guide image for guiding a user's hand gesture or a guide image for a screen movement direction according to "the mouse input function corresponding to user input".

19. The display device of claim 1, wherein the screen further comprises a scroll bar capable of being scrolled, and
wherein, when the touch input is touch in a specific area of the scroll bar and drag in a specific direction, the controller is configured to switch the touch input to a directional key input in the specific direction after clicking the specific area of the scroll bar and to output a screen scrolled in the specific direction.

* * * * *